United States Patent [19]

Suzuki et al.

[11] Patent Number: 5,406,398
[45] Date of Patent: Apr. 11, 1995

[54] LIQUID CRYSTAL INJECTION METHOD USING DUMMY ELECTRODES

[75] Inventors: Masaaki Suzuki, Yokohama; Yuichi Masaki, Kawasaki; Toshifumi Yoshioka, Hadano; Mutsuo Mitsui, Hachiohji, all of Japan

[73] Assignee: Canon Kabushiki Kaisha, Tokyo, Japan

[21] Appl. No.: 145,641

[22] Filed: Nov. 4, 1993

Related U.S. Application Data

[62] Division of Ser. No. 956,299, Oct. 5, 1992, Pat. No. 5,285,300.

[30] Foreign Application Priority Data

Oct. 7, 1991 [JP] Japan .................. 3-285436
Oct. 14, 1991 [JP] Japan .................. 3-291884
Oct. 14, 1991 [JP] Japan .................. 3-291885

[51] Int. Cl.6 .................. G02F 1/1339; G02F 1/1343
[52] U.S. Cl. .................. 359/80; 359/87
[58] Field of Search .................. 359/87, 80

[56] References Cited

U.S. PATENT DOCUMENTS

| | | | |
|---|---|---|---|
| 4,569,574 | 2/1986 | Masaki et al. | 350/334 |
| 4,660,935 | 4/1987 | Iwashita et al. | 359/87 |
| 4,682,858 | 7/1987 | Kanbe et al. | 359/100 |
| 4,687,299 | 8/1987 | Yamada | 359/54 |
| 4,832,457 | 5/1989 | Saitoh et al. | 359/54 |
| 4,976,516 | 12/1990 | Carrington | 359/80 |
| 5,000,545 | 3/1991 | Yoshioka et al. | 359/87 |
| 5,026,143 | 6/1991 | Tanaka et al. | 359/54 |
| 5,056,893 | 10/1991 | Holz et al. | 359/54 |
| 5,124,826 | 6/1992 | Yoshioka et al. | 359/87 |
| 5,150,233 | 9/1992 | Enomoto et al. | 359/54 |
| 5,161,043 | 11/1992 | Narutaki et al. | 359/54 |
| 5,185,059 | 2/1993 | Nishida et al. | 156/659.1 |

FOREIGN PATENT DOCUMENTS

| | | |
|---|---|---|
| 0090079 | 10/1983 | European Pat. Off. . |
| 0385419 | 9/1990 | European Pat. Off. . |
| 0444580 | 9/1991 | European Pat. Off. . |
| 55-45073 | 3/1980 | Japan .................. 359/80 |
| 63-266427 | 11/1988 | Japan .................. 359/87 |
| 2102175 | 1/1983 | United Kingdom . |
| 2177533 | 1/1987 | United Kingdom . |

*Primary Examiner*—William L. Sikes
*Assistant Examiner*—Ron Trice
*Attorney, Agent, or Firm*—Fitzpatrick, Cella, Harper & Scinto

[57] ABSTRACT

A liquid crystal device is constituted by a pair of oppositely spaced substrate each having on its opposite surface a group of stripe electrodes disposed to intersect with those disposed on the other substrate, and a liquid crystal disposed between the substrates so as to be driven by a voltage applied through the stripe electrodes. The group of stripe electrodes on at least one of the pair of substrates are formed through a lithographic step including dividing the stripe electrodes into at least two divisions at a line parallel (or perpendicular) to the extension of the stripe electrodes, and repeating a pattern exposure for each division of the stripe electrodes so as to dispose a joint between the divisions of the stripe electrodes at a non-display part including a spacing between two stripe electrode on the same substrate (or at a part in alignment with a non-display part including a spacing between two stripe electrodes on the opposite substrate). In an embodiment, the liquid crystal device is provided with a dummy electrode pattern for promoting the liquid crystal injection.

6 Claims, 7 Drawing Sheets

FIG. 12

LIQUID CRYSTAL INJECTION METHOD USING DUMMY ELECTRODES

This application is a division of application Ser. No. 07/956,299, filed Oct. 5, 1992, now U.S. Pat. No. 5,285,300.

FIELD OF THE INVENTION AND RELATED ART

The present invention relates to a liquid crystal device and a liquid crystal injection method, more particularly to a liquid crystal device using a chiral smectic liquid crystal and a liquid crystal injection method for preparing the device.

A liquid crystal display device is constituted by a pair of oppositely disposed substrates and a pair of stripe electrode groups respectively disposed on the substrates so as to intersect each other. In a lithographic step for forming such a group of stripe electrodes, particularly one for producing a liquid crystal display device having a display area of 10 inch or larger and a high definition requiring a resolution of 4 pel or more/mm, a high resolution and, in some cases, an alignment accuracy for superposing opaque electrodes for lowering the electric resistance of the stripe electrodes and for masking between pixels are required. For satisfying such performances, it has been practiced to divide each group of stripe electrodes into divisions, e.g., by a line intersecting the stripe electrodes, expose a division after a division, and join the divisions to form entire electrodes when exposure is performed by an exposure apparatus (e.g., "MAP-1500", mfd. by Canon K. K.). In this instance, the joints in the vertical direction have been conventionally disposed at positions superposed with an intersecting stripe electrode on the opposite substrate.

In a conventional device, however, when such a pair of substrates are superposed with each other so that their stripe electrodes intersect each other and a liquid crystal is disposed therebetween to form a display device, and the device is driven by applying voltages to the stripe electrodes, an alignment deviation in the vertical direction of the stripes, if it is large, is liable to appear on a display screen and be noticed by human eyes, thus deteriorating the display quality.

It is also practiced to divide the stripe electrodes on one or both substrates by a line parallel to the stripe electrodes. In this instance, the joint in the parallel direction has been generally disposed on one stripe electrode on a single substrate.

If the alignment deviation occurs in the parallel joint, the stripe electrode concerned is caused to have a different width from the other electrodes and provides pixels having different sizes (aperture areas), when intersected with the stripe electrodes on the opposite substrate, which are noticeable to human eyes.

Further, in case of superposing opaque electrodes for lowering the electric resistance of the respective stripe electrodes on one or both substrates and for masking between the pixels, an alignment deviation thereof with the single electrode on which the parallel joint is formed is also noticeable on display.

In a simple matrix cell, the electrode pattern is generally remarkably different between the display region and the peripheral part extended from the display region close to the seal, because the electrode pattern is modified at the latter part for loading or assemblage and the electrode for display is not provided near the seal.

In the prior art, however, the heated and injected front of the ferroelectric liquid crystal tends to proceed between electrodes formed by etching due to its surface tension, thus resulting in difficulties as follows.

At a part where the electrodes assume a different pattern from that of the display electrode, particularly at a part close to the seal, a much longer time is required for liquid crystal injection than the display electrode region. As a result, the part where the liquid crystal has been injected at a different speed is liable to later result in a different alignment state, which can further affect the neighboring region to result in an inferior display quality as a whole.

Further, on a conductor film or glass at a part where the liquid crystal has arrived at in a longer time, the liquid crystal is liable to move on later heating for re-alignment, etc., thus resulting in a vacuum void.

SUMMARY OF THE INVENTION

In view of the above-mentioned problems of the prior art, an object of the present invention is to provide a liquid crystal display device produced through a photo-lithographic step including divisional exposure for pattern printing for forming stripe electrodes on a substrate, wherein a deviation at the joint due to the divisional exposure or a mixed irregularity thereby is made less noticeable, thus preventing the lowering in display quality.

Another object of the present invention is to provide a method of injecting a ferroelectric liquid crystal, whereby the liquid crystal injection speed is made uniform, thereby uniformizing the alignment characteristic, over the entire cell area to provide an improved display quality.

According to the present invention, there is provided a liquid crystal device, a pair of oppositely spaced substrate each having on its opposite surface a group of stripe electrodes disposed to intersect with those disposed on the other substrate, and a liquid crystal disposed between the substrates so as to be driven by a voltage applied through the stripe electrodes; wherein said group of stripe electrodes on at least one of the pair of substrates are formed through a lithographic step including dividing the stripe electrodes into at least two divisions at a line parallel to the extension of the stripe electrodes, and repeating a pattern exposure for each division of the stripe electrodes so as to dispose a joint between the divisions of the stripe electrodes at a non-display part including a spacing between two stripe electrodes on the same substrate.

According to the present invention, there is further provided a liquid crystal device, a pair of oppositely spaced substrate each having on its opposite surface a group of stripe electrodes disposed to intersect with those disposed on the other substrate, and a liquid crystal disposed between the substrates so as to be driven by a voltage applied through the stripe electrodes; wherein said group of stripe electrodes on at least one of the pair of substrates are formed through a lithographic step including dividing the stripe electrodes into at least two divisions at a line perpendicular to the extension of the stripe electrodes, and repeating a pattern exposure for each division of the stripe electrodes so as to dispose a joint between the divisions of the stripe electrodes at a part in alignment with a non-display part including a spacing between two stripe electrodes on the opposite substrate.

According to another aspect of the present invention, there is provided a liquid crystal injection method for a liquid crystal device including a region where image display pattern electrodes are disposed within a cell surrounded by a seal for enclosing a liquid crystal, comprising injecting the liquid crystal while disposing a dummy pattern film for promoting the liquid crystal injection at a part other than the region with the image display pattern electrodes within the cell. More specifically, when a ferroelectric liquid crystal is injected into a cell, the injected front thereof proceeds to be injected between the electrodes while being aided by surface tension or surface intersection with the electrodes. Accordingly, by disposing such a dummy pattern film, the liquid crystal injection can be appropriately controlled and uniformized, whereby the resultant alignment and therefore the image quality are improved, and the production yield at the time of mass production is stabilized.

If the shape or design of the dummy pattern film is appropriately selected, the dummy pattern film can be used for prevention of the liquid crystal movement on heating after the injection or for ensuring a uniform cell gap and may also be used as an alignment mark required in the production process.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, the present invention will be described with reference to the drawings.

Figure 1:
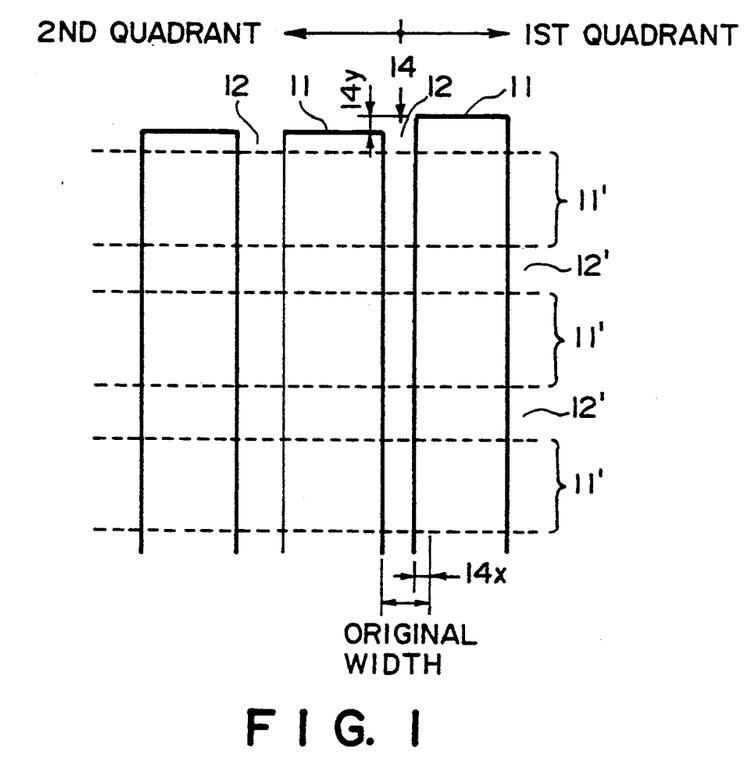
FIG. 1 is a partial plan view of the electrode part of an embodiment of the liquid crystal display device according to the invention.

FIG. 1 is a partial plan view of the electrode part of an embodiment of the liquid crystal display device according to the present invention. Referring to FIG. 1, transparent electrodes 11 constituting pixel electrodes are disposed with a spacing 12 (forming a spacing between pixels) so as to intersect with transparent electrodes 11' disposed with a spacing 12 on a counter substrate. A joint 14 between a first quadrant and a second quadrant is disposed at a spacing 12 and, at the joint 14, joint deviations 14x and 14y can appear in the x and y directions, respectively. Herein, each of the first and second quadrants is an area where printing is performed through a single exposure in a lithographic step. Thus, in this embodiment, the first quadrant is exposed in a first time and the second quadrant is exposed in a second time.

Figure 2:
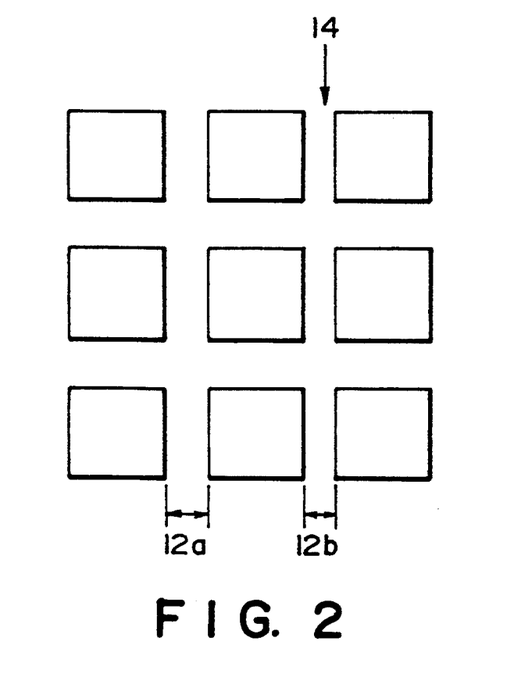
FIG. 2 is a plan view showing an arrangement of display pixels of the liquid crystal display device of FIG. 1.

FIG. 2 is a plan view showing arrangement of the resultant display pixels. As shown in FIGS. 1 and 2, a pixel spacing 12b including the joint 14 is different from an original pixel spacing 12a by the joint deviation 14x in the x direction but is not noticeable because it forms a non-display part.

Figure 3:
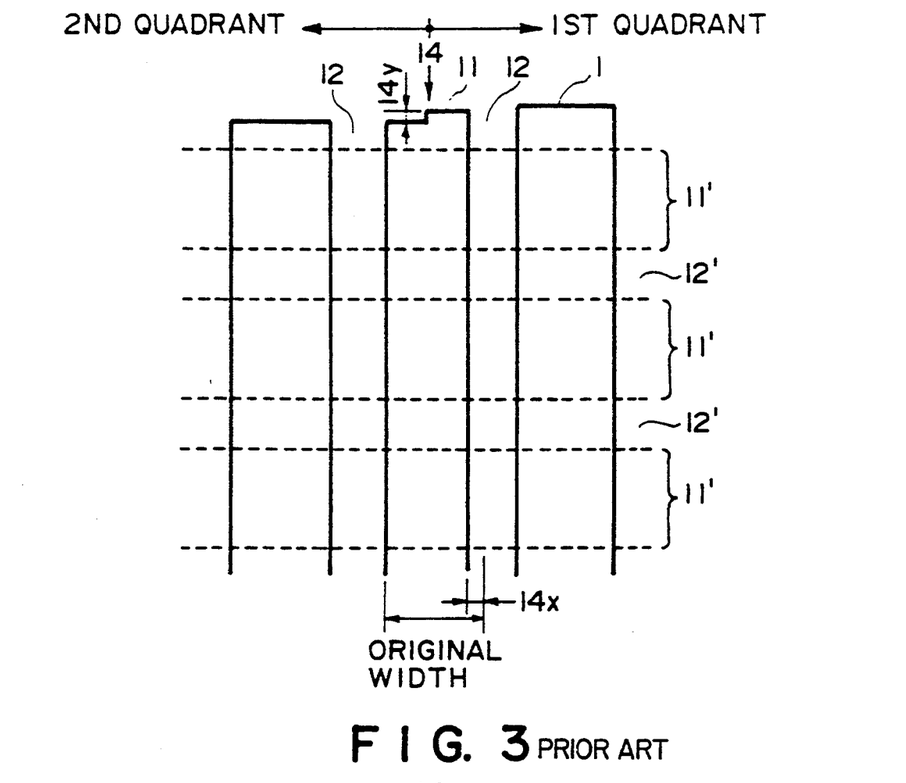
FIG. 3 is a partial plan view of the electrode part of a liquid crystal display device of the prior art.
Figure 4:
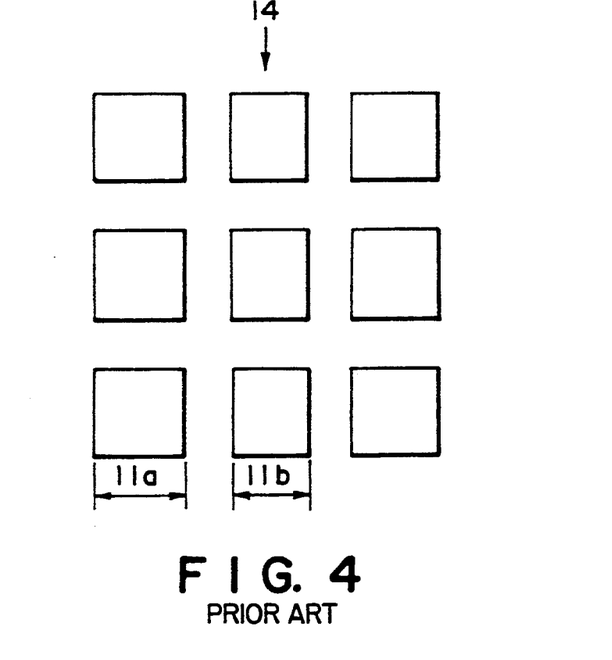
FIG. 4 is a plan view showing an arrangement of display pixels of the liquid crystal display device of FIG. 3.

In contrast thereto, FIG. 3 is a plan view of the electrode part of a liquid crystal display device of the prior art, wherein a joint 14 between the first and second quadrants is disposed on a transparent electrode 11. FIG. 4 is a plan view showing an arrangement of the resultant pixels corresponding to FIG. 3. As shown in FIGS. 3 and 4, a pixel width 11b including the joint 14 is different from an original pixel width 11a by a joint deviation 14x in the x direction, so that one line of the pixels provides a different luminance noticeable to human eyes.

Some examples of production are set forth below.

EXAMPLE 1

Two glass substrates each measuring 300×320×t1.1 (mm) were respectively coated by sputtering with a 1000 Å-thick transparent electrode (ITO) film, which was then patterned into stripe electrodes by photolithography. In this instance, the exposure was performed in four divisions by an exposure apparatus ("MPA-1500", mfd. by Canon K.K.) so as to provide a joint between pixels. The pattern of the stripe electrodes is shown in FIG. 1. Each transparent electrode 11 was formed in a width of 230 μm with a spacing 12 of 12 μm. The joint deviations 14x and 14y were respectively 1.5 μm.

When the two glass substrates thus treated were applied to each other to form a cell, which was then filled with a liquid crystal to form a liquid crystal device as described with reference to FIGS. 1 and 2. When the device was driven, no joint as a result of the four part division was noticed at all.

EXAMPLE 2

Figure 5:
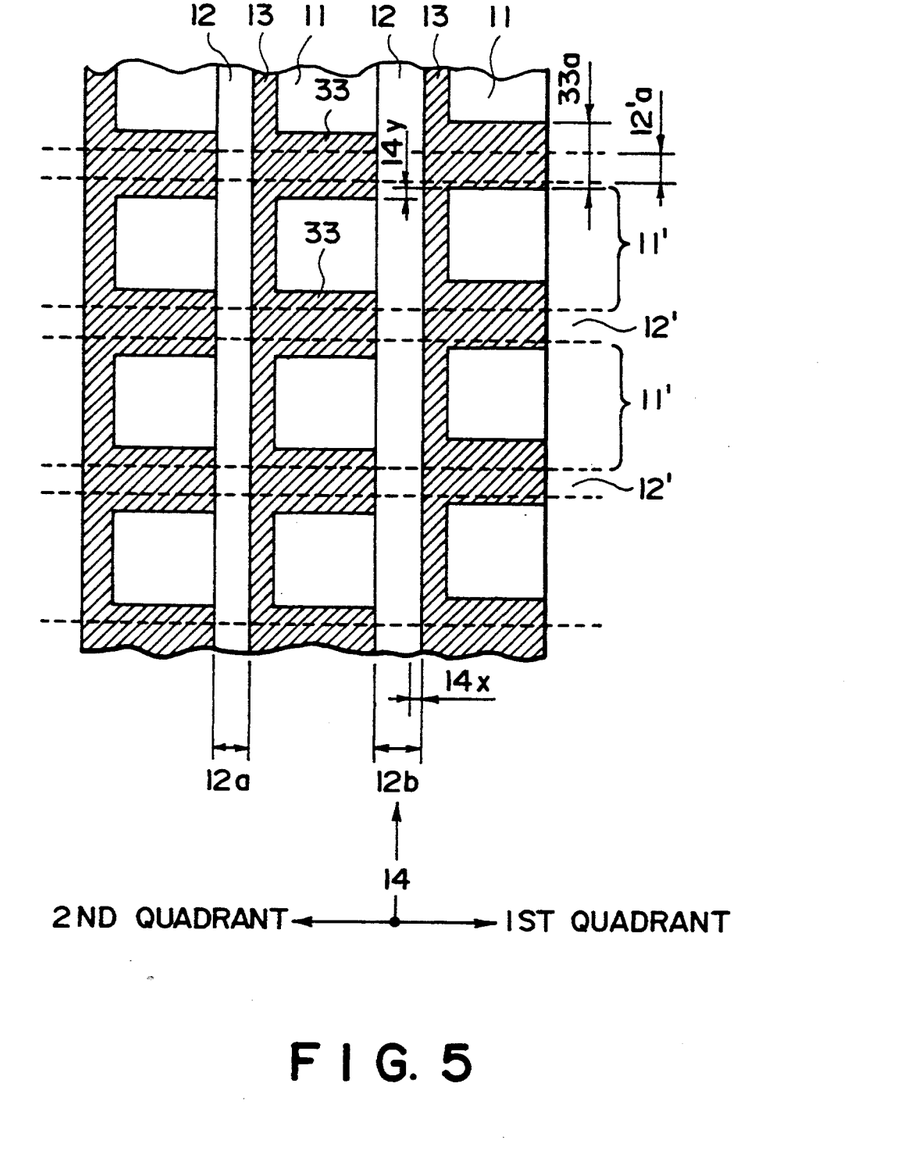
FIG. 5 is a partial plan view of the electrode part of another embodiment of the liquid crystal display device according to the invention.

FIG. 5 is a partial plan view of the electrode part of another embodiment of the liquid crystal display device according to the present invention. Referring to FIG. 5, a metal electrode 13 of a low electric resistance is disposed along each transparent electrode 11 constituting pixels. In connection with the metal electrodes are formed masking parts 33 for masking spacing between pixels on the counter substrate. Actually, it is a general practice that similar metal electrodes 13' and masking parts 33' are disposed also on the counter substrate, but they are omitted from showing for simplicity.

Referring to FIG. 5, a joint 14 between first and second quadrants is disposed at a spacing 12 between pixels. In addition to a joint deviation 14x in the x direction, a joint deviation 14y in the y direction due to the masking parts 33 occurs as a positional deviation of pixels between the first and second quadrants. However, if the width 33a of the masking part 33 is larger than the sum of a pixel spacing 12'a on the counter substrate and the joint deviation 14y in the y direction, there results in no change in actual display panel size nor does appear a joint in display pixels, so that the joint is not noticed.

A liquid crystal device as shown in FIG. 5 was prepared as follows. Two glass substrates each measuring 300×320×t1.1 (mm) were respectively provided with 1200 Å-thick stripe transparent electrodes in the same manner as in Example 1 and then further coated by sputtering with a 3000 Å-thick Mo metal electrode, which was then formed into a pattern as shown in FIG. 5 through a similar lithographic step as in the patterning of the transparent electrodes. In this instance, the transparent electrodes 11 and 11' were formed in a width of 220 μm, the metal electrodes 13 and 13' (not shown) were formed in a width of 20 μm, the metal masking parts 33 and 33' (not shown) were formed in a width of 30 μm, and each pixel spacing was set to 10 μm. The joint deviation 14x and 14y were respectively 1.2 μm.

When a liquid crystal display device was formed by applying the above-treated two substrates and driven, the joints as a result of the four part division were not noticeable at all.

As described above, by disposing a joint for forming a group of stripe electrodes in a direction parallel to the stripe electrodes at a non-display part on the same substrate, it is possible to provide a liquid crystal display device free from lowering in display quality even if a larger tolerance is provided in joint deviation arising from an error in mechanical accuracy.

According to the present invention, by disposing a joint for forming a group of stripe electrodes in a direction parallel to the stripe electrodes at a non-display part including a spacing between pixels on the same substrate and an opaque metal member, it is possible to prevent an adverse effect of a mechanical joint deviation from occurring in a display by liquid crystal drive.

Further, in case of a liquid crystal display device having opaque metal members for reducing the electric resistance of the stripe electrodes, the region of the opaque metal members may be included in the non-display part for obviating the adverse effect of the joint deviation.

Figure 6:
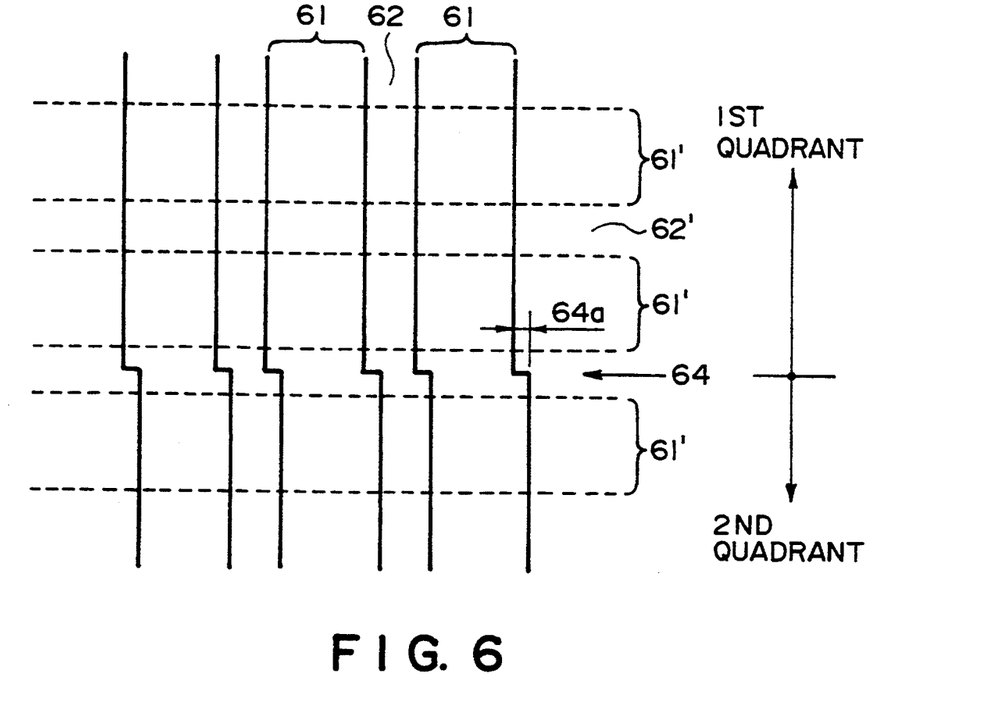
FIG. 6 is a partial plan view of the electrode part of another embodiment of the liquid crystal display device according to the invention.

FIG. 6 is a partial plan view of the electrode part of an embodiment of the liquid crystal display device according to the present invention. Referring to FIG. 6, transparent electrodes 61 constituting pixel electrodes are disposed with a spacing 62 (forming a spacing between pixels) so as to intersect with transparent electrodes 61' disposed with a spacing 62 on a counter substrate. A joint 64 between a first quadrant and a second quadrant is disposed at a spacing 62 on the counter substrate and, at the joint 64, a joint deviation 64a is present. Herein, each of the first and second quadrants is an area where printing is performed through a single exposure in a lithographic step. Thus, in this embodiment, the first quadrant is exposed in a first time and the second quadrant is exposed in a second time.

Figure 7:
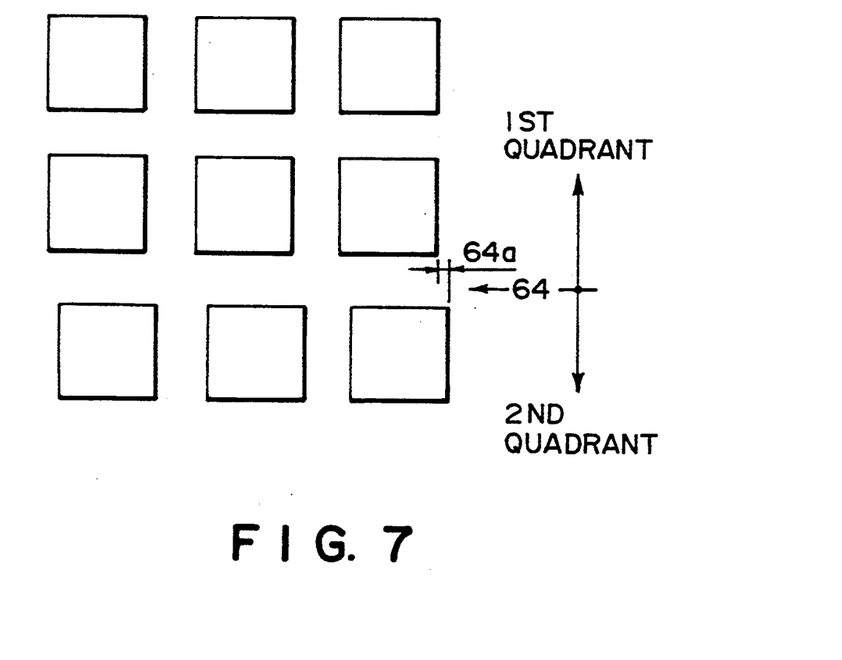
FIG. 7 is a plan view showing an arrangement of display pixels of the liquid crystal display device of FIG. 6.

FIG. 7 is a plan view showing arrangement of the resultant display pixels. As shown in FIGS. 6 and 7, the pixels in the first quadrant and the pixels in the second quadrant are deviated from each other by a joint deviation 64a at the joint 64, but the joint deviation is not noticeable because it is present in a non-display part.

Figure 8:
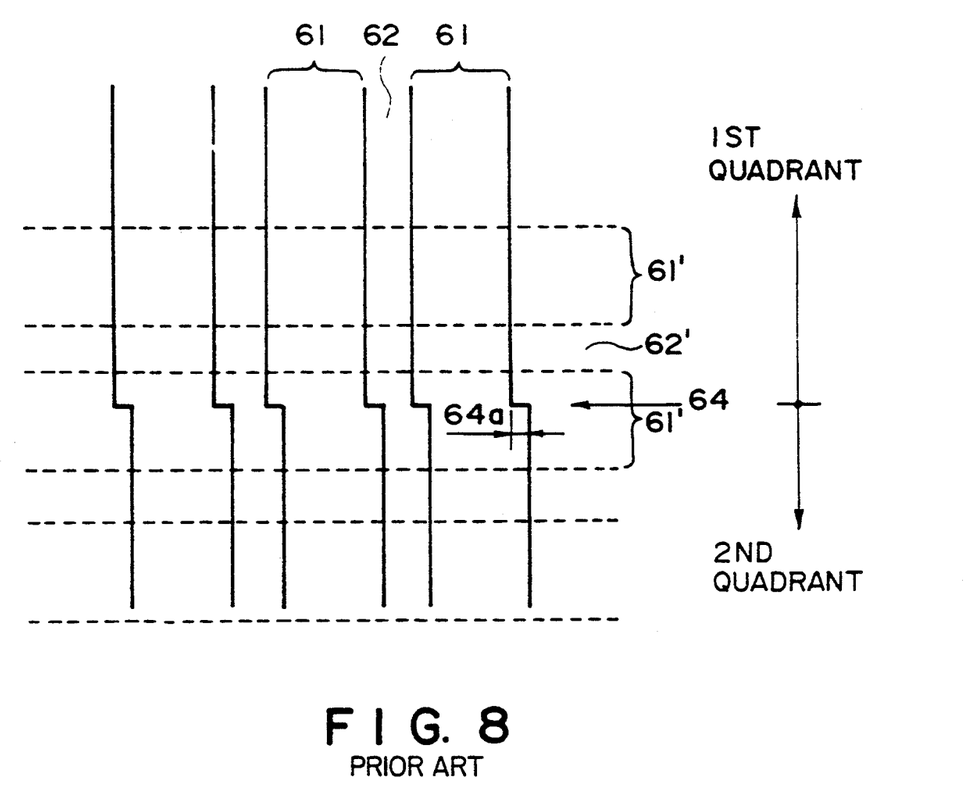
FIG. 8 is a partial plan view of the electrode part of a liquid crystal display device of the prior art.
Figure 9:
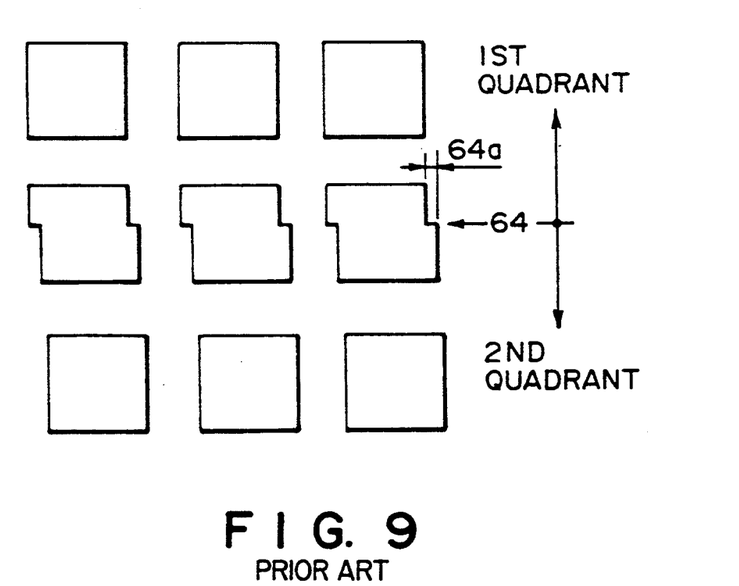
FIG. 9 is a plan view showing an arrangement of display pixels of the liquid crystal display device of FIG. 8.

In contrast thereto, FIG. 8 is a plan view of the electrode part of a liquid crystal display device of the prior art, wherein a joint 64 between the first and second quadrants is disposed in superposition of a transparent electrode 61' on the counter substrate. FIG. 9 is a plan view showing an arrangement of the resultant pixels corresponding to FIG. 8. As shown in FIGS. 8 and 9, a joint deviation 64a appears at pixels on the joint 64, so that it is noticeable to human eyes.

In the embodiment shown in FIGS. 6 and 7, the joint is disposed in alignment with a pixel spacing on the counter substrate. In case where metal electrodes are disposed in addition to transparent electrodes, a similar effect is obtained also when a joint is disposed in alignment with a non-display part including a pixel spacing and a metal electrode on the counter substrate.

EXAMPLE 3

Two glass substrates each measuring 300×320×t1.1 (mm) were respectively coated by sputtering with a 1000 Å-thick transparent electrode (ITO) film, which was then patterned into stripe electrodes by photolithography. In this instance, the exposure was performed in four divisions by an exposure apparatus ("MPA-1500", mfd. by Canon K.K.) so as to provide a pattern of the stripe electrodes as shown in FIG. 6. Each transparent electrode 61 was formed in a width of 200 μm with a spacing 12 of 20 μm. The joint deviation 64a was 2.0 μm.

When the two glass substrates thus treated were applied to each other so that the joint on one substrate was aligned with a pixel spacing on the counter substrate and vice versa, thereby to form a cell. The cell was then filled with a liquid crystal to form a liquid crystal device as described with reference to FIGS. 6 and 7. When the device was driven, no joint as a result of the four part division was noticed at all.

EXAMPLE 4

Figure 10:
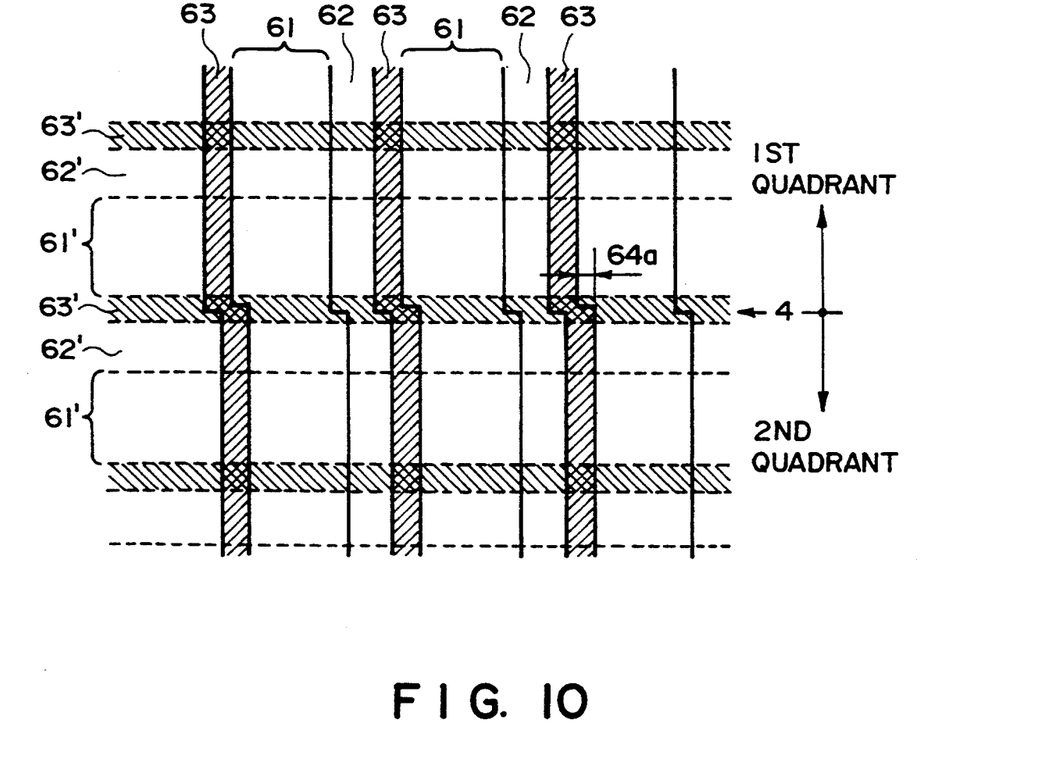
FIG. 10 is a partial plan view of the electrode part of another embodiment of the liquid crystal display device according to the invention.

FIG. 10 is a partial plan view of the electrode part of another embodiment of the liquid crystal display device according to the present invention. Referring to FIG. 10, metal electrodes 63 and 63' of a low electric resistance are disposed along transparent electrodes 61 and 61', respectively, constituting pixels. Herein, a joint 64a formed at a joint between the first and second quadrants is in alignment with a metal electrode 63' (i.e., a non-display part) and is not noticeable.

A liquid crystal device as shown in FIG. 10 was prepared as follows. Two glass substrates each measuring 300×320×t1.1 (mm) were respectively provided with 1200 Å-thick stripe transparent electrodes in the same manner as in Example 3 and then further coated by sputtering with a 2000 Å-thick Al metal electrode, which was then formed into a pattern as shown in FIG. 10 through a similar lithographic step as in the patterning of the transparent electrodes. In this instance, the transparent electrodes 61 and 61' were formed in a width of 250 μm, the metal electrodes 63 and 63' were formed in a width of 30 μm, and each pixel spacing 62 was set to 10 μm. The joint deviation 64a was 1.5 μm.

A liquid crystal display device was formed by applying the above-treated two substrates so that the joint on one substrate was aligned with a metal electrode on the other substrate and vice versa. When the device was driven, the joints as a result of the four part division were not noticeable at all.

As described above, by disposing a joint for forming a group of stripe electrodes in a direction perpendicular to the stripe electrodes at a non-display part on the counter substrate, it is possible to provide a liquid crystal display device free from lowering in display quality even if a larger tolerance is provided in joint deviation arising from an error in mechanical accuracy.

In case where the present invention is applied to a liquid crystal display device having opaque metal electrodes for lowering the electric resistance of the stripe electrodes, the regions of the opaque metal electrodes may be included in the non-display region.

In the above embodiments, the liquid crystal may preferably be a chiral smectic liquid crystal showing ferroelectricity.

Figure 11:
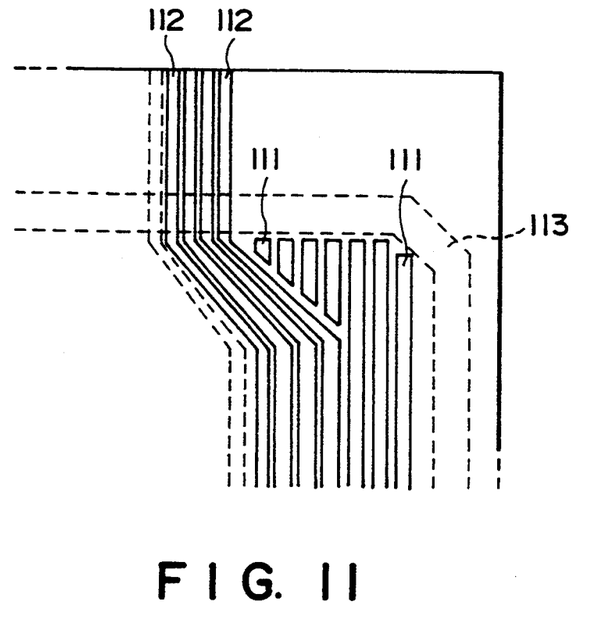
FIG. 11 is a partial plan view of an embodiment of the liquid crystal cell according to the invention.

FIG. 11 is a partial plan view of a liquid crystal cell according to an embodiment of the present invention. Referring to FIG. 11, the liquid crystal cell includes pattern electrodes 112 for image display and dummy pattern films 111 for aiding the progress of a liquid crystal along them within a seal area 113.

A liquid crystal injected through an injection port proceeds between a narrow path between image display pattern electrodes 112 left after etching. At this time, the liquid crystal proceeds at an identical speed also between the dummy pattern films up to a corner near the seal 113 under similar conditions as in the image display area.

Figure 12:
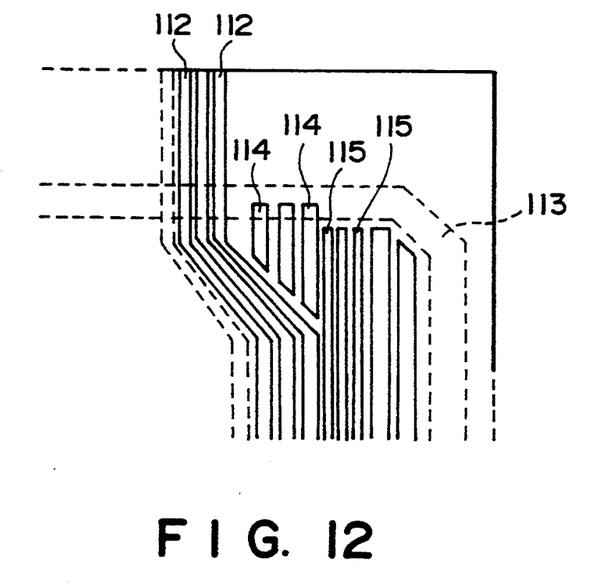
FIG. 12 is a partial plan view of another embodiment of the liquid crystal cell according to the invention wherein the dummy pattern film is also used for another purpose.

FIG. 12 is a partial plan view of a liquid crystal cell according to another embodiment of the present invention. In this embodiment, a dummy pattern film for aiding the liquid crystal injection is also used for another purpose. More specifically, the cell includes image display pattern electrodes 112 and dummy pattern films 114 for aiding the liquid crystal injection within the seal area 113. The dummy pattern films 114 extends up to the seal area 113, whereby they also function to provide a uniform cell gap which is liable to be affected by the display pattern electrode thickness. The liquid crystal cell also includes dummy pattern films 115 which have a narrower width than the display pattern electrodes 112 and can be disposed in a higher density the in the display area. This is effective in preventing movement of a ferroelectric chiral smectic liquid crystal which is liable to move at the time of reheating after the injection and also in preventing the occurrence of a void caused by injection failure.

Herein, the dummy pattern film may generally be of a similar material as a transparent image display pattern electrode or an opaque metal member but can be in a different shape as far as it shows the required effect of promoting the liquid crystal injection.

As described above, by disposing a dummy pattern film for aiding liquid crystal injection, a liquid crystal can be satisfactorily injected up to a part where the liquid crystal is not readily filled, so that it is possible to shorten the time required for liquid crystal injection into a cell of an identical volume, thus enhancing the capacity of the production apparatus.

What is claimed is:

1. A method for producing a liquid crystal device comprising:
   providing a cell structure comprising a pair of substrates disposed opposite to each other with a gap therebetween, said cell structure having image display pattern electrodes in a region, a portion of said cell structure other than said region having at least one substrate bearing a dummy pattern film with a width narrower than that of the image display pattern electrodes, the cell structure further comprising a sealing member disposed at a peripheral part of the substrates to seal the gap between the substrates while providing an injection port; and
   injecting a liquid crystal into said cell structure through the injection port.

2. A method according to claim 1, wherein said image display pattern electrodes are stripe shaped.

3. A method according to claim 2, wherein the stripe-shaped pattern electrodes have an opaque metal member disposed thereon.

4. A method according to claim 1, further including a step of heating the cell structure after the liquid crystal has been injected through the injection port.

5. A method according to claim 1, wherein said liquid crystal is a chiral smectic liquid crystal.

6. A method according to claim 1, wherein said dummy pattern film is disposed to extend to the sealing member.

* * * * *

UNITED STATES PATENT AND TRADEMARK OFFICE
CERTIFICATE OF CORRECTION

PATENT NO. : 5,406,398
DATED : April 11, 1995
INVENTOR(S) : MASAAKI SUZUKI, ET AL.

It is certified that error appears in the above-identified patent and that said Letters Patent is hereby corrected as shown below:

ON TITLE PAGE

In [57] ABSTRACT:
Line 15, "electrode" should read --electrodes--.

COLUMN 1

Line 22, "10 inch" should read --10 inches--.

COLUMN 2

Line 37, "strate" should read --strates--.
Line 53, "substrate" should read --substrates--.

COLUMN 4

Line 54, "When the" should read --The--.

COLUMN 5

Line 14, "results in" should read --results--.

UNITED STATES PATENT AND TRADEMARK OFFICE
CERTIFICATE OF CORRECTION

PATENT NO. : 5,406,398
DATED : April 11, 1995
INVENTOR(S) : MASAAKI SUZUKI, ET AL.

It is certified that error appears in the above-identified patent and that said Letters Patent is hereby corrected as shown below:

COLUMN 8

Line 2, "the in" should read --than in--.

Signed and Sealed this

Eleventh Day of July, 1995

Attest:

BRUCE LEHMAN

*Attesting Officer*          *Commissioner of Patents and Trademarks*